United States Patent [19]

Plessers et al.

[11] Patent Number: 4,909,389
[45] Date of Patent: Mar. 20, 1990

[54] FILMSHEET PACKAGE AND METHOD OF PACKAGING FILMSHEETS

[75] Inventors: Hendrik S. Plessers, Wychmaal; Dirk Peeters, Kontich; Joseph C. Van Looy, Edegem; Emiel J. Wollaert, deceased, late of Schoten, all of Belgium; Manfred Schmidt, Kircherheim; Johann Zanner, Unterhaching, both of Fed. Rep. of Germany; by Magdalena I. Lambrechts, legal representatives

[73] Assignee: Agfa-Gevaert N.V., Mortsel, Belgium

[21] Appl. No.: 260,315

[22] Filed: Oct. 20, 1988

[30] Foreign Application Priority Data

Oct. 30, 1987 [BE] Belgium .................. EP 87202099.5

[51] Int. Cl.4 ............................................. B65D 85/48
[52] U.S. Cl. ..................................... 206/451; 206/455
[58] Field of Search ............... 206/455, 451, 456, 454, 206/491, 449, 444, 445

[56] References Cited

U.S. PATENT DOCUMENTS

| | | | |
|---|---|---|---|
| 1,961,344 | 6/1934 | Ecken, Jr. | 206/451 |
| 3,341,003 | 9/1967 | Marsh | 206/451 |
| 3,979,051 | 8/1976 | Close | 206/455 |
| 4,093,069 | 6/1978 | Smolderen | 206/455 |
| 4,480,423 | 11/1984 | Muller | 206/455 |

Primary Examiner—Joseph Man-Fu Moy
Attorney, Agent, or Firm—Joseph J. Daniel

[57] ABSTRACT

A film sheet package comprising a stack of film sheets wrapped in a light-tight flexible wrapper sleeve (33), one end of the sleeve having a closed flap (26) and the opposite end of the sleeve having an open flap (27) that is folded to light-tightly close the package, wherein the side ends (53, 54) of the open flap are tucked in, the top end (56) of said flap is folded back at least once, but not so far that said top end, or a portion thereof, becomes wedged between the bottom end of said flap and the corresponding rear face of the package as said flap is folded on the top face of the package, and that said flap is fixed on said top face through rupturable sealing means (28).

10 Claims, 5 Drawing Sheets

FILMSHEET PACKAGE AND METHOD OF PACKAGING FILMSHEETS

BACKGROUND OF THE INVENTION

1. Field of the Invention

The present invention relates to a film sheet package for use in a magazine of a film cassette loader, and a method of packaging film sheets.

The invention relates in particular to a film sheet package for use with a magazine which comprises a box with a light-tight lid and a winding mechanism at the frontside for pulling the wrapper from a film sheet package contained in the magazine thereby to set the film sheet stack free for removal of the film sheets from the stack, one by one, through the opened lid by a suitable removal mechanism. The film sheet package comprises a stack of film sheets wrapped in a light-tight sleeve that is sealed at one end and arranged for being gripped at this end by the winding mechanism of the magazine, and that is provided at the opposite end with an open flap folded back to light-tightly close the film package.

Filmcassette loaders comprising magazines of the described kind, are used for instance in medical X-ray departments where usually a combined film cassette unloader-loader is provided for removing in daylight conditions an image-wise exposed film sheet from a film cassette and conveying it to a film processor, and for immediately reloading the empty cassette with a fresh film of the appropriate format, taken from a corresponding magazine with fresh film sheets.

2. Description of Related Art

A film sheet package of the described type is disclosed in DE GMS No. 77 25 804. A film sheet package in which the open flap is folded back as teached by the DE GMS shows the disadvantage that sometimes the withdrawal of the wrapper is impossible as a consequence of jamming of the end folds of the wrapper. The more pull is exerted by the winding spindle of the magazine, the more the folded open flap becomes tightened against the corresponding rear face of the stack of sheets.

It is the object of the present invention to provide an improved film sheet package of the described type, the opening of which proceeds smoother and more controlled than does the known package.

SUMMARY OF THE INVENTION

According to the present invention, a film sheet package for use in a film magazine of a film cassette loader, said film magazine comprising a body with a light-tight lid, and a winding mechanism at the frontside for pulling the wrapper from a filmpackage in the magazine thereby to set the film sheet stack free for removal of the film sheets from the stack through the opened lid by a suitable sheet removal mechanism, said package comprising a stack of film sheets light-tightly wrapped in a sleeve that is sealed at one end and has a flap for engagement by the said winding mechanism, and that is provided at the opposite end with an open flap that is folded back to light-tightly close the package, is characterised in that the side ends of the open flap are tucked in, that the top end of said open flap is folded back at least once, but not so far that said top end, or a portion thereof, becomes wedged between the bottom end of said flap and the corresponding rear face of the package as said flap is folded on the top face of the package, and that said flap is fixed on said top face through rupturable sealing means.

The filmpackage according to the invention has the advantage that the pulling tension that is produced by the winding mechanism on the wrapper before the rupturable sealing means are ruptured, does not operate to increase the friction between the folded flap of the wrapper and the stack of sheets to an extent such that finally any further displacement of the wrapper sleeve over the stack becomes impossible, unless the wrapper becomes ruptured. On the contrary, the initial displacement of the sleeve by the pulling tension causes the inwardly folded side ends of the open flap to become pulled progressively along the lateral side faces of the stack of sheets, whereby they operate to "wedge open" or to unfold the folded flap so that friction of the wrapper with the end face of the stack of sheets is considerably reduced.

In consequence, a substantial amount of the pulling force at the pull flap is transmitted to the top end of the open flap, at the place where the rupturable sealing means are provided. Since the rupturing force of common rupturable sealing means is pretty well constant within a limited range, it will be understood that in the mentioned way the opening of the package will occur with a controllable pulling force.

According to a preferred embodiment of the invention, the side ends of the open flap are tucked in over the full length of the flap. In that way, the co-operation of the tucks with the stack of sheets is maximum in initiating the smooth unfolding of the folded flap.

A suitable form of the rupturable sealing means is one wherein the sealing means are formed by self-adhesive strips that extend lengthwise of the package and that have a central zone of weakened cross-section and free of adhesive.

The material that is used for the sleeve is preferably a thermo-sealable plastic, that is light-tight and that combines toughness with flexibility, low elasticity, and low friction. Suitable materials are low density polyethylene, a laminate of low and high density polyethylene, molecularly oriented as the case may be, etc.

Film sheet packages of the described kind usually comprise a U-shaped paperboard wrapper that serves to stiffen and to protect the stack of sheets during transport and manipulation of the package. According to a suitable embodiment of the invention, the upper leg and the interconnecting leg of the paperboard wrapper have a central cut-away portion, and the lower leg has a central longitudinal weakening thereby to permit some flexing of the wrapper about its central longitudinal axis. This feature permits the stack of sheets to be more easily introduced in the wrapper sleeve during the manufacturing of the package, and also it permits the finished film sheet package to be more easily introduced in the magazine of a film cassette loader.

A film sheet package according to the invention may comprise X-ray sensitive film sheets for use with cassettes with fluorescent intensifying screens as usual in the art, but a film sheet package according to the invention may also comprise so-called electronic imaging film sheets, for use with a cassette that serves to load such films by daylight in an exposure apparatus wherein a film sheet becomes exposed to one or a plurality of images on the screen of a CRT, or produced by a modulated scanning beam of radiation, e.g. a laser recording beam.

The invention includes also a method of wrapping a stack of film sheets in a light-tight envelope.

According to the invention, a method of wrapping a stack of film sheets in a light-tight envelope, is characterised by the steps of providing a longitudinally foldable U-like protective wrapper for the stack of sheets, placing the stack of sheets into the U-like wrapper, providing a light-tight wrapper sleeve that is light-tightly sealed at one end and open at the opposite end, pulling the wrapper sleeve over a concave loading platform, longitudinally folding the stack of film sheets while in its wrapper, and inserting the stack inside the opened sleeve, withdrawing the sleeve with the film sheets from the loading platform and tucking in the side ends of the open flap portion of the sleeve, folding back the top end of said flap at least once but not that far to become wedged between the bottom end of the flap and the corresponding rear face of the package as said flap is folded on top of the package, and fixing the flap through rupturable sealing means to said top face.

BRIEF DESCRIPTION OF THE DRAWINGS

The invention will be described hereinafter by way of example with reference to the accompanying drawings, wherein.

DESCRIPTION OF THE PREFERRED EMBODIMENT

Figure 1:
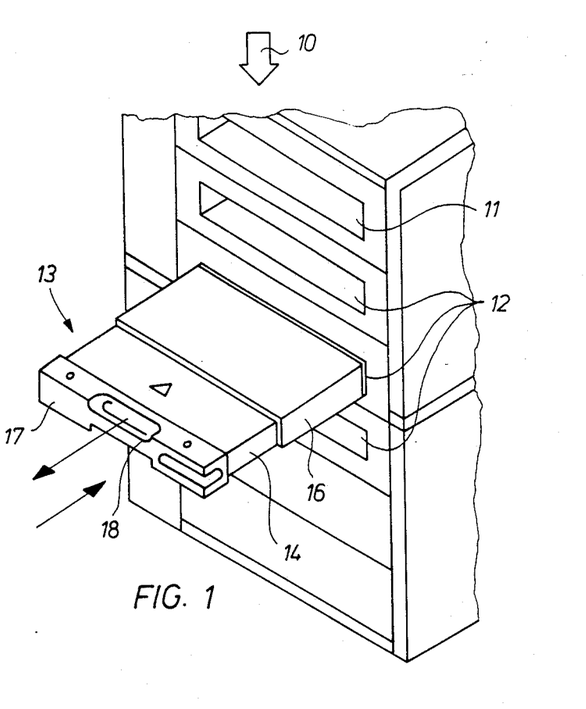
FIG. 1 is a diagrammatic perspective view, partly broken away, of one embodiment of a cassette loader-unloader.

FIG. 1 illustrates diagrammatically an automatically operating sheet film cassette loader-unloader which is generally designated by the numeral 10, and which is connected, not shown, with a processor for the processing of image-wise exposed X-ray films unloaded from their cassettes.

Apparatus of the described kind are generally known and are used on a centralised or de-centralised basis in hospitals most of them still having one or more darkrooms at their disposal for the reloading of the magazines of the apparatus with fresh film.

The frontside of the apparatus 10 has vertically spaced rectangular openings, the upper opening 11 being arranged for receiving a cassette to be unloaded and reloaded, and the other openings 12 being arranged for receiving magazines, such as the illustrated magazine 13, which each contain a stack of film sheets of a different format.

The several magazines are equal to each other, but they are provided with displaceable walls at the innerside thereby to allow the exact location of different film formats in the magazine.

As a cassette with an image-wise exposed X-ray image is introduced in the upper opening 11, appropriate means light-tightly close the entrance opening of the apparatus, align the cassette in a correct unloading position, unlock and open the cassette, remove the exposed film therefrom and convey it towards a processing station, and finally select an unexposed film of the right format from a corresponding magazine, load it into the still opened cassette, and then close and lock the cassette so that it becomes available for a next X-ray exposure.

Figures 2, 3:
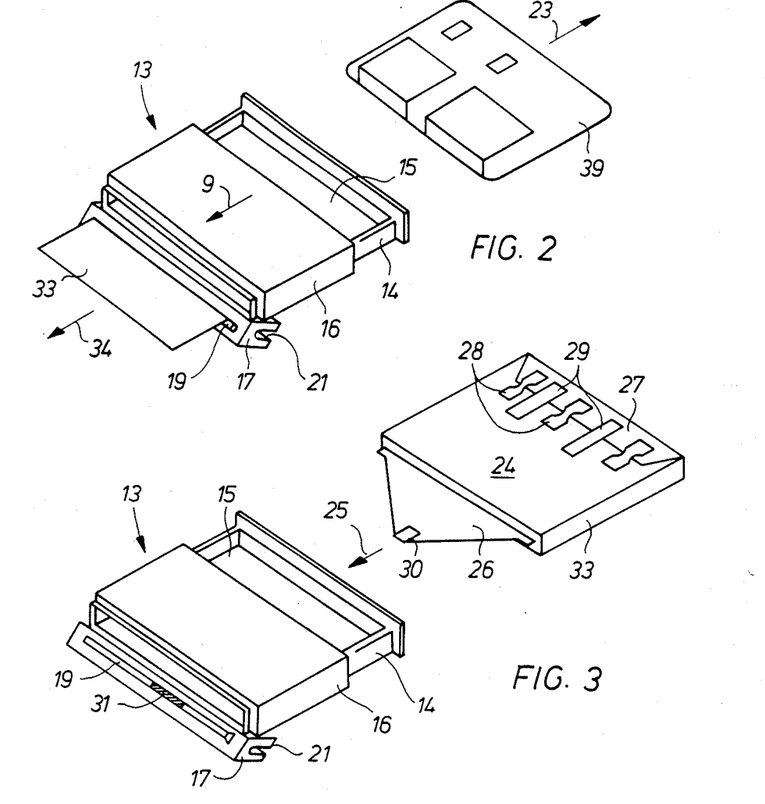
FIG. 2 is a perspective view of an empty film magazine removed from the apparatus according to FIG. 1.
FIG. 3 is a perspective view of the film magazine according to FIG. 2, as it is being loaded with a fresh film sheet package.

The magazine 13 consists of a flat rectangular body 14 that has at the rear end an opening 15 (see FIG. 2) in the top wall that may be light-tightly closed by means of a sleeve-like slide 16 that may be displaced towards the right-hand side according to the view of FIG. 2, in order to light-tightly close the opening in the top wall.

Figure 4:
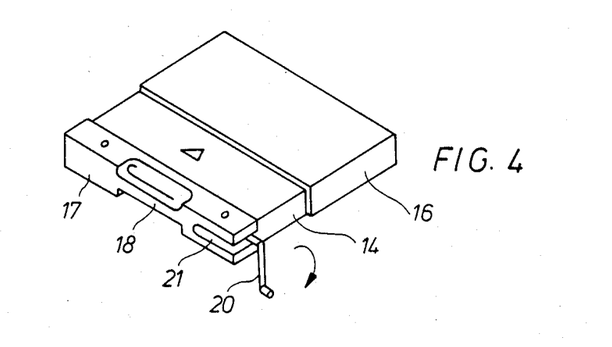
FIG. 4 is a perspective view of the film magazine according to FIG. 2, as the wrapper sleeve is being removed from the film stack.

The front part 17 of the magazine is hingeable to the body 14 and may be swung from a closed position as shown in FIG. 1, into an open position as shown in FIGS. 2 and 3. The front part has a handle 18 for carrying the magazine, and a winding spindle 19, see FIGS. 2 and 3, that may be manually rotated by means of a crank 20 as illustrated in FIG. 4. The crank 20 is pliable and may be folded away in a recess 21 in the frontpart.

The operation of loading a magazine with a fresh film pack is now described with reference to FIGS. 2 to 4. The operator who has removed an empty magazine from the apparatus 10, unlocks in daylight the slide 16 and pulls it forwardly as illustrated in FIG. 2, by the arrow 9, thereby to open the body 14. The operator then removes the cardboard wrapper 39 of the previous film pack from the opened magazine through the opening 15, as illustrated by the arrow 23. The cardboard wrapper has a protective function for the stack of film sheets and will be described hereinafter.

The operator also removes the light-tight wrapper 33 of the previous film pack from the winding spindle, by pulling it in the direction of the arrow 34. To this end, the crank 20 has been disengaged from the recess 21 in order to permit the spindle to rotate freely.

Then the operator takes a fresh film pack 24 and inserts it in the magazine through the opening 15 as illustrated by the arrow 25.

The filmpack is wrapped in a light-tight flexible wrapper 33 that has a generally triangular, light-tightly sealed flap 26 at its front side and an open but light-tightly folded flap 27 at its rearside that is kept closed by means of three rupturable sealing strips 28, and two non-rupturable strips 29. The top of the flap 26 is provided with means for producing a pulling engagement between the flap and the winding spindle 19. In the present example, the top is provided with a folded strip 30 of fabric adhered to the flap, the strip having a plurality of tiny loops on its outer surface. The central portion of the winding spindle is provided with a woven sleeve 31 bearing a plurality of tiny hooks. The described fastening combination is known under the Tradename VELCRO.

The front part 17 of the magazine being closed, the operator notices the occurrence of the first contact of the strip 30 with the sleeve 31 as he pushes the film pack in the magazine, by the buckling of the flap 26. At that moment he gently rotates the winding spindle by means of the crank 20 until he feels that a firm pulling engagement has been produced between the spindle and the flap. Then the rotation is stopped.

The operator removes the sealing strips 29 from the package and slides the slide 16 in rearward direction in order to light-tightly close the magazine. The operator finally resumes the rotation of the crank 20 whereby the longitudinal tension on the wrapper is increased to such an extent that finally the sealing strips 28 are broken. Up from that moment, the flap 27 is free to unfold itself as the packing sleeve is pulled forwardly by the winding action of the spindle 19. The operator continues the winding until he feels that the resistance to rotation of the crank decreases which is an indication for the complete removal of the wrapper from the film stack. The crank may be rotated for a further few revolutions in order to be sure of the complete removal of the wrapper and thereafter the magazine, which is now ready for use, may be introduced in the apparatus 10. There may be provided an indicator for signalling to the operator that the wrapper has been completely removed. In a suitable form, such indicator may comprise a lever for sensing the increase in diameter of the winding spindle by the wound wrapper, and for displaying the ultimate position of the lever in a small window in the front part of the magazine.

After the magazine 13 has been introduced in a corresponding section of the apparatus, the front end of the slide 16 becomes hooked behind the front wall of the apparatus so that further pushing on the front part 17 of the magazine causes the body structure 14 to slide within the now arrested slide 16 so that the magazine becomes opened as shown in FIGS. 2 and 3 whereby its uncovered film stack becomes accessible for removing the film sheets, one by one, by an appropriate suction mechanism.

The removal of the last film sheet of the stack is detected by mechanical sensors the levers of which can reach through openings such as 36 and 37 that are provided in the bottom leg of the paperboard wrapper 39. The magazine may then be removed from the apparatus and refilled as described hereinbefore.

Apparatus as described hereinbefore are commercially available on the market under the Tradenames SCOPIX Compact S Imaging Center and CURIX Capacity Film Center, and they are manufactured by Agfa-Gevaert N.V., Mortsel-Belgium.

The filmpackage according to the present invention, and one method for its manufacturing are described more in detail hereinafter.

Figures 5A, 5B, 5C:
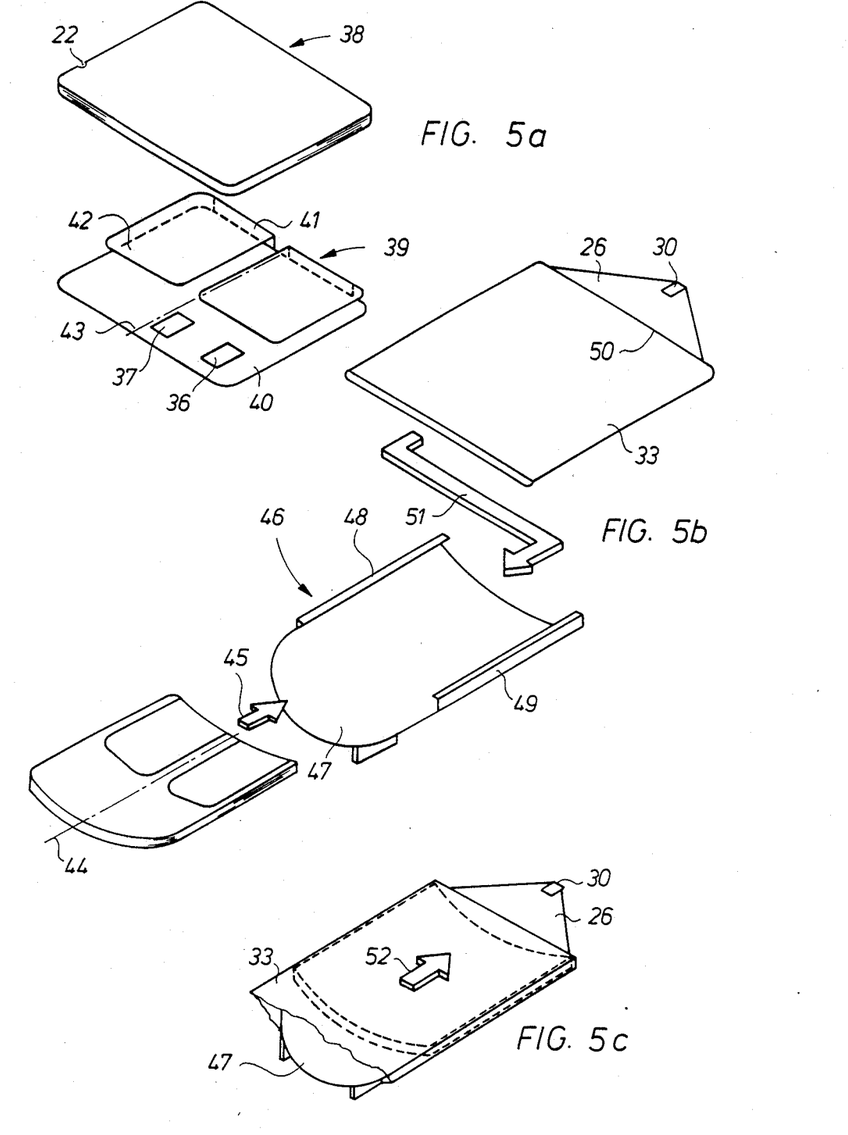
FIGS. 5a to 5c illustrate the different steps of the assembling of a film sheet package.

Referring to FIGS. 5a to 5c, FIG. 5a shows an exploded view of the content of one filmpack. This content consists of a stack of unwrapped X-ray film sheets 38 and a U-like cardboard wrapper 39. The film sheets are provided with a notch 22 that serves for the identification of the emulsion side of a film after the exposure and processing of the film.

The cardboard wrapper has different functions. First, it must stiffen the stack of film sheets and protect the upper and lower film sheets against accidental pressure marks through the outer, flexible wrapper foil.

Further, it must facilitate the handling of the stack of sheets during the insertion of the stack in the wrapper sleeve. Finally, its central and upper leg must prevent the upper sheet(s) from being pulled from the stack as the wrapper sleeve is being removed from the film package.

The wrapper 39 has a lower leg 40 the size of which corresponds with that of the film sheets, an intermediate leg 41 the height of which corresponds with the height of the film stack, and an upper leg 42 the length of which is about half the length of the first leg.

The leg 40 is provided with openings 36 and 37 mentioned already, and with a longitudinal weakening 43 in the form of a cut at the outside face through approximately half the thickness of the cardboard foil.

The intermediate and the second legs each have a central interruption with a width of some centimeters. The weakening 43 and the central interruptions permit the package to be curved about a longitudinal axis as illustrated by the line 44 in FIG. 5b, in view of the insertion of the stack in a light-tight wrapper sleeve 33.

The curved stack of sheets is pushed, as indicated by the arrow 45, in a stationary stack assembling member 46 consisting of a curved base plate 47 with lateral, upstanding walls 48 and 49 having a height slightly in excess of the thickness of the filmstack and the paperboard wrapper.

The light-tight wrapper of the film pack consists of a sleeve 33 that is open at one end and has a transverse seal 50 and a triangular-like flap 26 at the opposite end. In the present embodiment, the sleeve has been cut from a black pigmented polyethylene tube that was made by blow molding, whereas the flap 26 was cut from an equally black pigmented polyethylene foil that has a thickness slightly in excess of the thickness of the sleeve. The connection of the flap with the sleeve occurred through heatsealing. The top end of the flap 26 is provided with a strip of a VELCRO fastening 30.

The described sleeve is slid over the member 46 in the direction shown by the arrow 51.

Finally, the film stack thus wrapped is removed together with the wrapper sleeving from the member in the direction of the arrow 52 as illustrated in FIG. 5c.

The closing of the film package occurs as illustrated in FIGS. 6a to 6d.

Figure 6A:
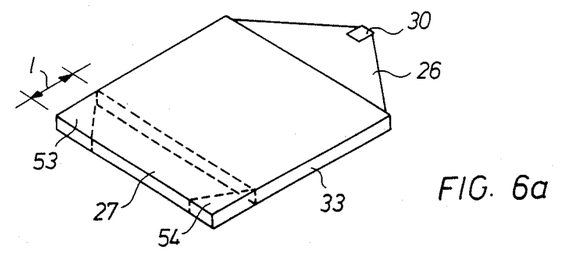
FIGS. 6a to 6d illustrate the closing of the open end flap of the package.
Figure 6B:
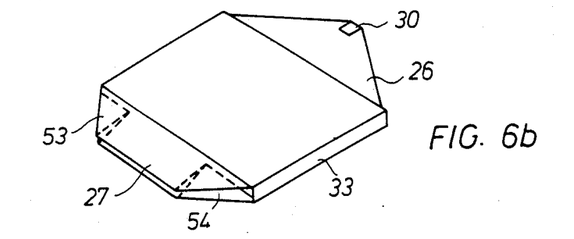

The side ends 53 and 54 of the open flap 26 of the flexible wrapper 33, see FIG. 6a, are tucked in over 90 degrees so that a configuration as shown in FIG. 6b is obtained. The tucking-in may occur over only part of the length l of the open flap, but preferably the tucking in occurs over the full length of the flap as illustrated in the drawing.

Figure 6C:
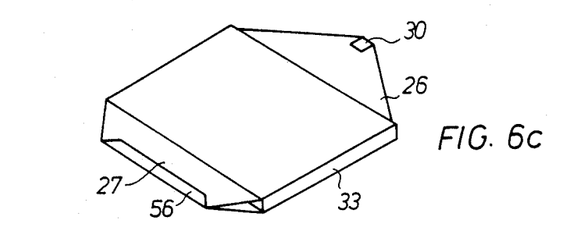
Figure 6D:
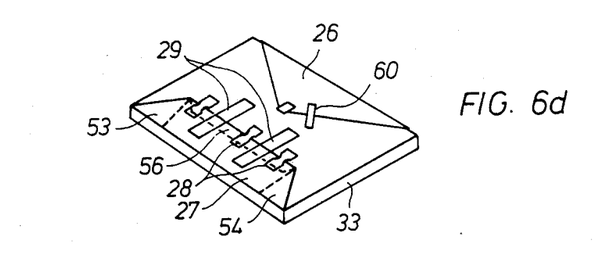

The top end 56 of the open flap is folded over 180 degrees as shown in FIG. 6c, and then the one flap is completely folded over 180 degrees and applied onto the top of the package as shown in FIG. 6d. The folded flap 26 is secured to the package by means of three easily rupturable self-adhesive strips 28, and two difficulty rupturable strips 29.

Figure 7:
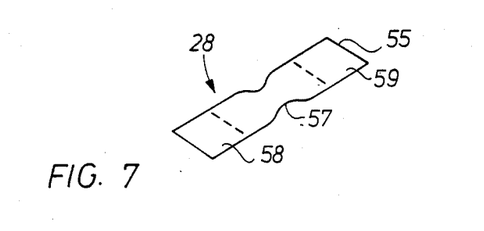
FIG. 7 illustrates a rupturable sealing strip.

The strips 28 consists of rectangular piece 55 of paper, see FIG. 7, that has a central zone 57 of reduced width, and two self-adhesive end zones 58 and 59, the limits of which are indicated by broken lines. It has been shown that the central zone of reduced width, and free of adhesive, permits to obtain a well controlled rupturing force.

The strips 29 may be conventional self-adhesive strips and their only purpose is prevent premature rupturing of the strips 28.

Figure 8:
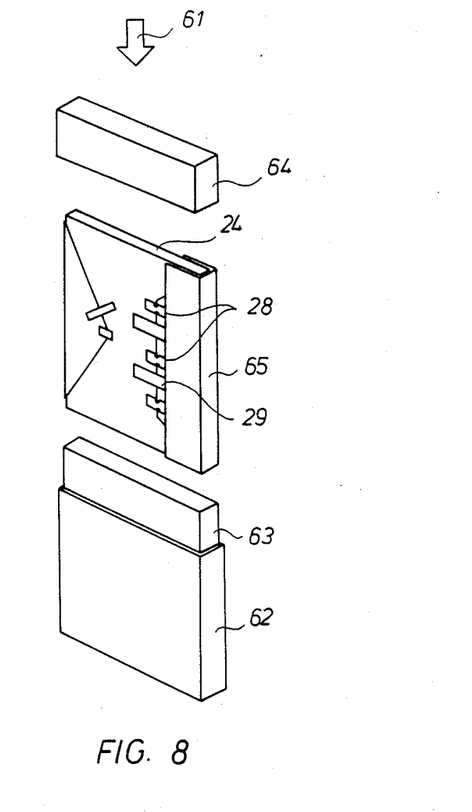
FIG. 8 is an exploded view of a complete film package.

The closed flap 26 of the package is fitted to the top of the package by means of a self-adhesive strip 60. The film pack produced as described hereinbefore, is introduced into a telescope-type cardboard box 61 as illustrated in FIG. 8. The box comprises a bottom part 62 with a shoulder section 63 fixedly connected therewith, and a lid 64 that may telescope over the shoulder 63.

The filmpackage is clamped in a U-like paperboard protector 65 that protects the sealing strips 28 and 29 from occasional damaging during the insertion of the film pack in the box 62. The box may then be closed and a sealing or warranty label may be stuck on the lid and the bottom part of the box. The inner surface of the topwall of the lid 64 may occasionally be provided with a foam cushion or the like, for obtaining a firm clamping of the package within the box.

EXAMPLE

The following example illustrates the new type of filmpackage described hereinbefore.

Film formats: $8 \times 10''$, $10 \times 8''$, $11 \times 14''$ and $14 \times 17''$.
Contents of a package: 100 film sheets.
Wrapping sleeve: blow-moulded black pigmented low density polyethylene with a thickness of 0.12 mm.
Leading flap: black pigmented low density polyethylene with a thickness of 0.20 mm.

The described invention is not limited to the disclosed embodiment.

The winding engagement between the top of the pulling flap 26 and the winding spindle may also occur by engagement of the flap with a longitudinal slot of the spindle, by engagement of a hole punched in the flap with a hook on the spindle, by taping the flap to the spindle, etc. In both cases it is necessary to open the top part 17 of the magazine in order to effect the attaching of the flap to the spindle. The triangular flap 26 may be replaced by a flap having the shape of a truncated triangle, or having two or more lips or extensions applied to perform the first engagement with the winding spindle.

The flexible wrapper of the film pack may also be made of a foil, or foils, rather than from a sleeve.

The closed flap 26 need not necessarily be made from a separate sheet material, but it may also be obtained by cutting appropriate portions from the sleeve 33.

The easily rupturable sealing strips that provide a controlled opening force for the wrapper may be replaced by tapes that have been partly cut or perforated. There may be less than three such easily rupturable sealing strips.

The sealing strips 28 and/or 29 may take an inclined position, such as that of the strip 60, thereby involving less risk for the strip to be damaged or peeled off, during the insertion of the film package in the box 61.

We claim:

1. A film sheet package (24) for use in a film magazine (13) of a film cassette loader (10), said film magazine comprising a body (14) with a light-tight lid (16), and a winding mechanism (19, 20) at the frontside for pulling the wrapper from a filmpackage in the magazine thereby to set the film sheet stack free for the removal of the film sheets from the stack through the opened lid by a suitable sheet removing mechanism, said package comprising a stack (38) of film sheets light-tightly wrapped in a sleeve (33) that is sealed at one end, and that has a flap (26) for engagement by the said winding mechanism, and that is provided at the opposite end with an open flap (27) folded to light-tightly close the package, characterised in that the side ends (53, 54) of the open flap (27) are tucked in, that the top end (56) of said open flap (27) is folded back at least once, but not so far that said top end, or a portion thereof, becomes wedged between the bottom end of said flap and the corresponding rear face of the package as said flap is folded on the top face of the package, and that said open flap (27) is fixed on said top face through rupturable sealing means (28).

2. A film sheet package according to claim 1, wherein the side ends (53, 54) of the open flap (27) are tucked in over the full length l of the flap.

3. A film sheet package according to claim 1, wherein the fixation of the open flap (55) to the top face of the package occurs additionally through non-rupturable sealing means (29) in addition to the rupturable sealing means (28).

4. A film sheet package according to claim 1, wherein the rupturable sealing means are formed by self-adhesive strips that extend lengthwise of the package and that have a central zone (57) of weakened cross-section and free of adhesive.

5. A film sheet package according to claim 1 wherein the stack of sheets (38) is fitted in a U-shaped paperboard wrapper (39), one leg (42) and the interconnecting leg (41) of which have a central cut-away portion, and the other leg (40) of which has a central longitudinal weakening (43), thereby to permit longitudinal flexing of the wrapper.

6. A film sheet package according to claim 5, wherein said longitudinal weakening (43) is formed by a longitudinal slit at the outside face of the corresponding leg of the wrapper.

7. A film sheet package according to claim 1 which is packed in a telescope-type cardboard box (61), and the portion of the package comprising the folded open flap and the rupturable sealing means is protected by a separate U-shaped paperboard protector (65).

8. A film sheet package according to claim 1 which comprises a stack of X-ray films.

9. A film sheet package according to claim 1 which comprises a stack of electronic imaging films.

10. A method of wrapping a stack of film sheets in a light-tight envelope, comprising the steps of
providing a longitudinally foldable U-like protective wrapper for the stack of sheets,
placing the stack of sheets into the U-like wrapper,
providing a light-tight wrapper sleeve that is light-tightly sealed at one end and open at the opposite end,
pulling the wrapper sleeve over a concave loading platform,
longitudinally folding the stack of film sheets while in its wrapper, and inserting the stack into the opened sleeve,
withdrawing the sleeve with the film sheets from the loading platform and tucking in the side ends of the open flap portion of the sleeve, folding back the top end of said flap at least once but not so far that said top end would become wedged between the bottom end of the flap and the corresponding rear face of the package as said flap is folded on top of the package, and
fixing the flap through rupturable sealing means on said top face.

* * * * *

UNITED STATES PATENT AND TRADEMARK OFFICE
CERTIFICATE OF CORRECTION

PATENT NO. : 4,909,389

DATED : March 20, 1990

INVENTOR(S) : Hendrik S. Plessers, et al.

It is certified that error appears in the above-identified patent and that said Letters Patent is hereby corrected as shown below:

Column 8

Claim 10, line 3, change "foldable" to --flexible--
         line 11, change "folding" to --flexing--

Signed and Sealed this

Third Day of December, 1991

Attest:

HARRY F. MANBECK, JR.

*Attesting Officer*  *Commissioner of Patents and Trademarks*